Nov. 10, 1936.　　　J. S. CLAPPER　　　2,060,280

MOWING APPARATUS

Filed Dec. 24, 1934　　　5 Sheets-Sheet 1

INVENTOR
JOHN S. CLAPPER
BY *Paul, Paul & Moore*
ATTORNEYS

Nov. 10, 1936.  J. S. CLAPPER  2,060,280
MOWING APPARATUS
Filed Dec. 24, 1934  5 Sheets—Sheet 5

INVENTOR
JOHN S. CLAPPER
BY Paul, Paul Moore
ATTORNEYS

Patented Nov. 10, 1936

2,060,280

UNITED STATES PATENT OFFICE 2,060,280

MOWING APPARATUS

John S. Clapper, Minneapolis, Minn.

Application December 24, 1934, Serial No. 759,051

18 Claims. (Cl. 56—25)

This invention relates to improvements in mowing implements. An object of the invention is to provide a mowing implement assembly which can be quickly attached to or detached from any suitable automotive vehicle.

Another object is to so arrange the attachment that the cutting portions of it can be raised clear of the ground, when it is desired to move along streets or across roads, etc., from one mowing area to another.

Another object is to provide means for adjustably raising and lowering certain parts of the assembly, and to provide means for swinging adjustment of the mowing implement independently of other parts of the attachment. Other objects are: to provide drive means of the belt type driven from the rear wheel propeller shaft of an automobile or from an equivalent part or parts and to provide a novel belt-tightening and releasing means operable by the driver when seated in driving position, to render the belt inoperative or operative for driving purposes.

Features of the invention include: the arrangement of a swinging frame beneath the chassis to extend laterally therebeyond at one side; the pivotal attachment to the free end of this frame of a mowing implement, to swing vertically; means for adjustably raising the frame and the mowing implement; the provision of a ground wheel for the frame, for holding the frame in operative position, and allowing it to automatically adjust itself to inequalities in the ground as the vehicle advances; and all details of construction relating to the scheme of attachment of the mowing implement to the frame; and of the frame to the vehicle, and also the various means for adjusting the frame and cutter, as well as the means for driving the cutter from the drive shaft of an automotive vehicle.

Objects, features and advantages of the invention will be set forth in the description of the drawings forming a part of this application and in said drawings Figure 1 is a top plan view showing the invention applied to an automotive vehicle;

Numeral 1 generally indicates the chassis of an automotive vehicle, having front wheels 2 and rear wheels 3. The front axle is indicated at 4, the steering wheel at 5 and a driver's seat at 6. The vehicle may be and preferably is of the tractor type, equipped with rubber-tired wheels. The rear wheel propeller shaft is indicated at 8, which may have the usual universal joints, and the shaft is preferably driven from a special gear box indicated at 9, to adapt the drive for proper speed control of the vehicle for the mowing operation. The general relations of the mowing attachment of this invention to the vehicle are well shown in Figure 1, the vehicle being shown in dot-and-dash lines. The mowing device, or mowing attachment, is located under the chassis and between the front and rear wheels.

Figures 1, 7, 8:
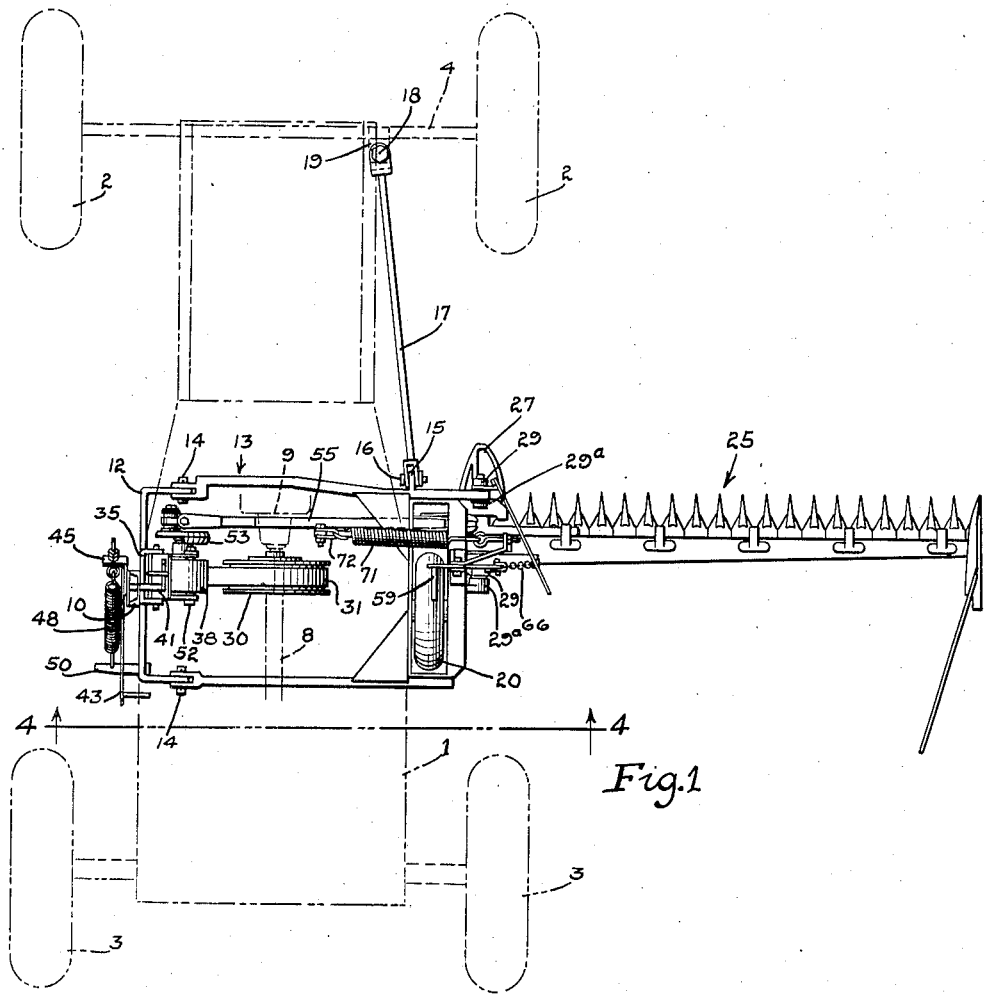
Figure 7 is a view of the belt-tightening means, corresponding to the left-hand portion of Figure 4, but showing the belt-tightening means in belt-tightening position.
Figure 8 is a vertical section on line 8—8 of Figure 7 showing the relation of the belt-tightener operating finger to the bar of the idler pulley arm.
Figure 2:
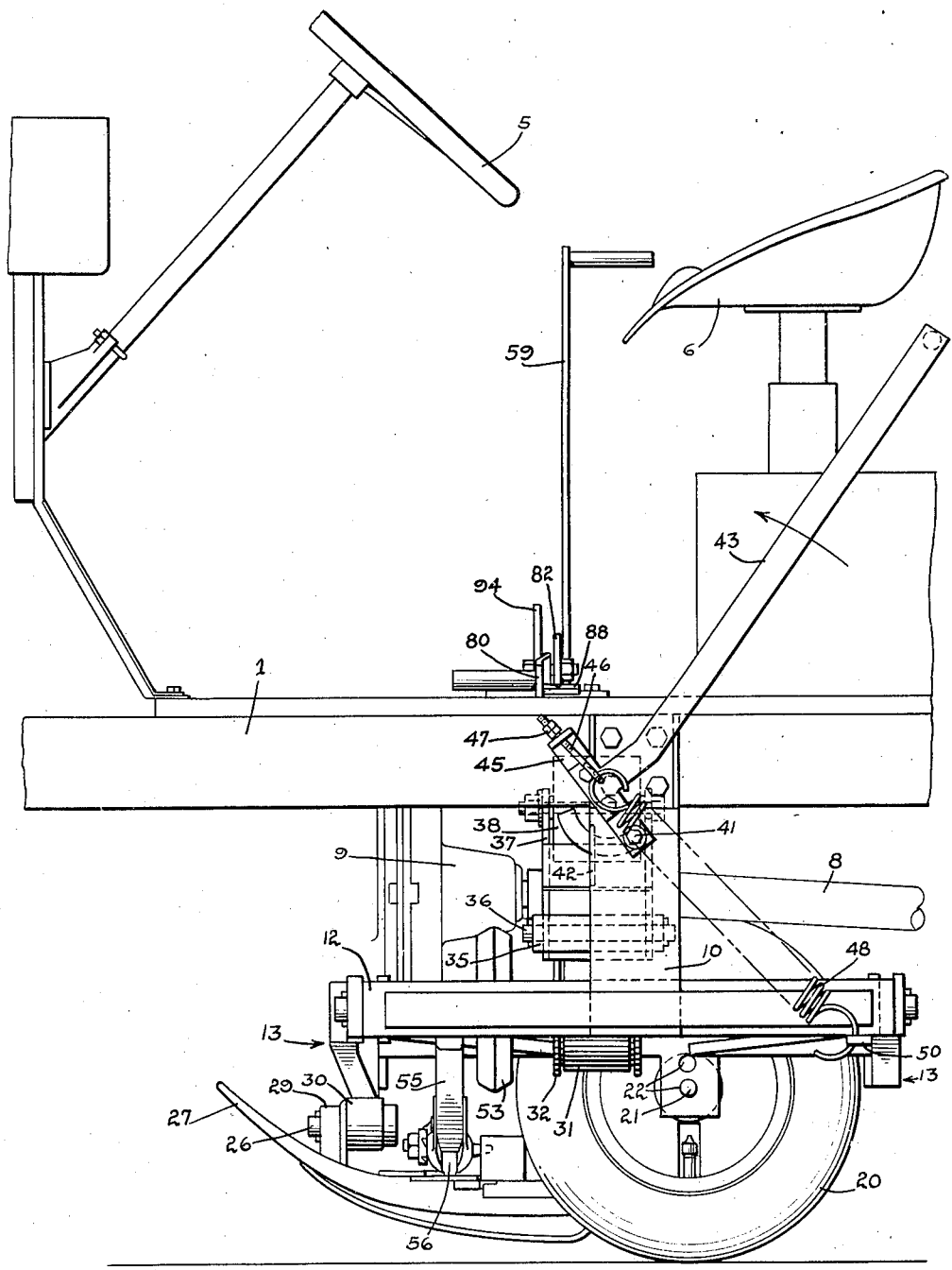
Figure 2 is a side elevation looking from the left-hand side of Figure 1 and showing the relation of the cutter drive control lever to the driver's seat.
Figure 3:
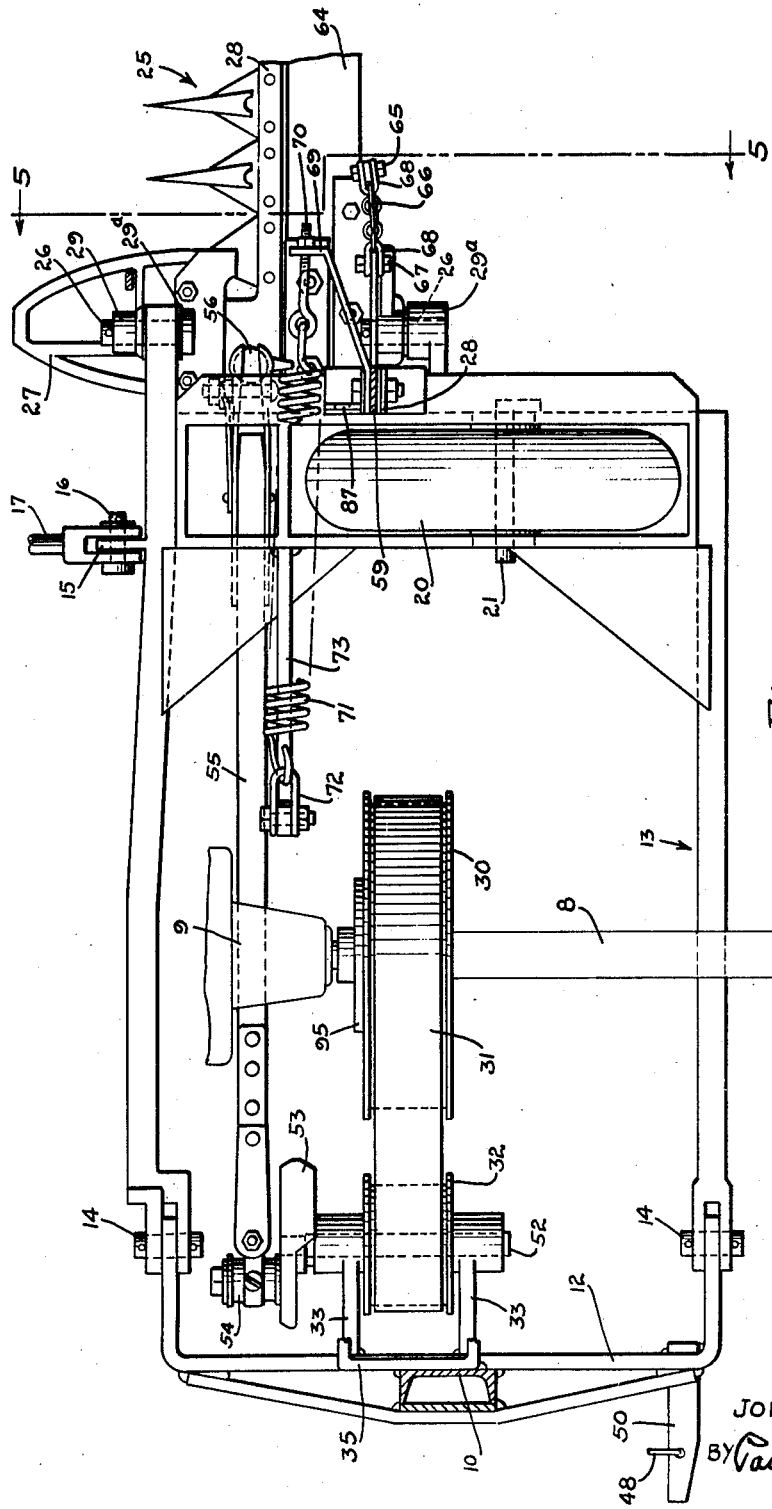
Figure 3 is a top plan view substantially like Figure 1, illustrating the mower frame on a larger scale, and showing the support which connects the frame to the vehicle, in section.
Figure 4:
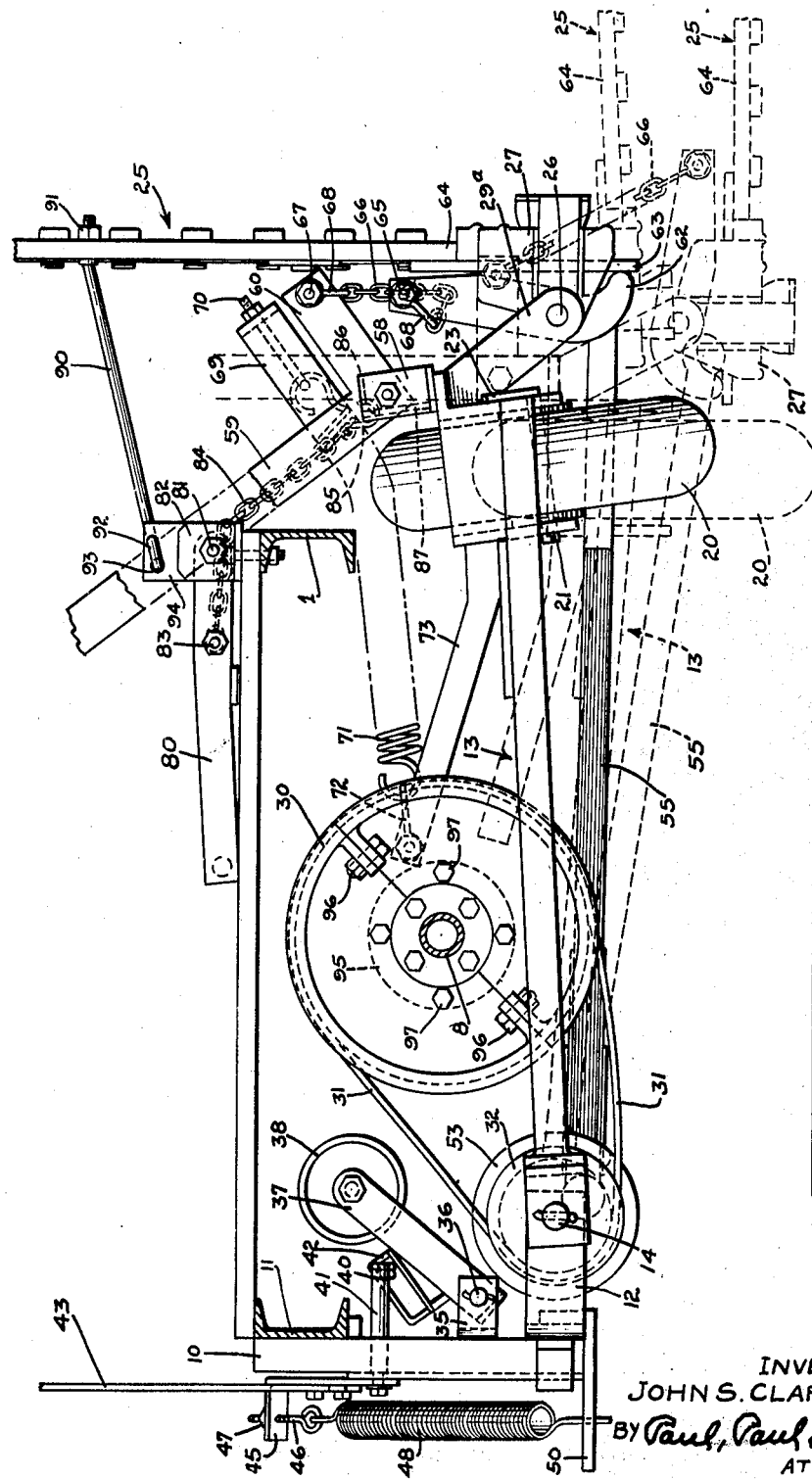
Figure 4 is a cross-section through the chassis taken substantially on line 4—4 of Figure 1, showing the mower attachment in elevation, with its frame and mower in elevated or inoperative position, and showing in dotted lines the lowered or ground position of the frame and mowing implement.

Referring to Figures 2, 3 and 4: Numeral 10 indicates a member, such as a channel iron, arranged vertically and suitably rigidly attached at its upper end, as by bolts 11ª, to a side rail 11 of the chassis 1. To this iron 10 is attached, in horizontal relation, see Figure 3, bracket 12, U-shaped as viewed in top plan. To this bracket is pivoted a frame generally indicated at 13, the pivoting means being indicated at 14, and consisting of pins axially aligned lengthwise of the vehicle, or in direction of vehicle travel. One side or one end of the frame is pivoted adjacent one side of the chassis. The frame 13 extends toward and laterally beyond the opposite side of the chassis, as shown in Figure 4. The frame is suitably reenforced, and at the forward side, see Figure 1, is a lug 15 to which is pivoted as at 16, a drawbar 17, the opposite end of the drawbar being pivoted as at 18 to a bracket 19 carried by the front axle. The character of the pivotal connections 16 and 18, and the character of the pivoting means 14 are such as to allow the frame to freely swing vertically. The character of the bolted connection 11ª and of the drawbar connections permits quick attachment or detachment of the frame, together with the connected parts.

The frame has, at its outer free end, a supporting ground wheel 20 rotative on an axle 21 arranged transversely to the direction of travel. The axle is insertable in one or another of a series of vertically aligned bearing openings 22, and has an arm 23 attached by screw 24 to one of the threaded openings 24ª of the frame. Thus the wheel axis can be raised or lowered. The frame can automatically adjust itself to inequalities in the ground. Moreover, the frame can be lowered to operative and raised to inoperative positions, see Figures 4 and 6.

Figure 5:
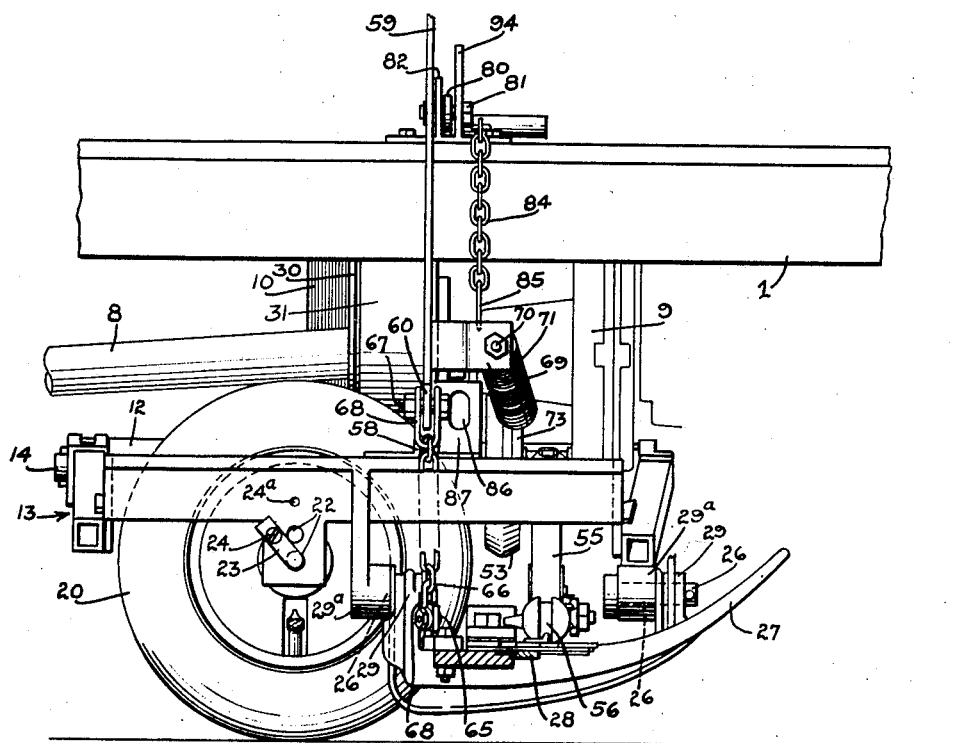
Figure 5 is a sectional-elevation taken substantially on line 5—5 of Figure 3.

A mowing implement generally indicated at 25, in this instance of the reciprocating cutter bar type, has its inner end pivoted to the free outer end of the frame 13, and the implement extends laterally of the frame and of the chassis, as shown. The pivoting means is indicated at 26, see Figures 3 and 5, and the pivotal axes of the frame with the chassis and of the mowing implement with the frame extend longitudinally of the vehicle or in direction of travel. It is noted that the ground wheel is located at a point between these pivotal axes, and at a point adjacent the pivotal connection of the mowing implement with the frame. A ground shoe 27, or mower support, is provided, and the reciprocable cutter blade bar is indicated at 28.

The shoe 27 is provided with lugs 29, as bearings, which are connected as shown by the pins 26 with the bearings 29ª of the frame. Attached to the shoe is the base bar having the usual fingers. There is no intention to be entirely limited to the particular construction of mower shown inasmuch as other forms of mowing implements may be used.

A feature of the invention is the operation of the mowing implement, by driving connections from a vehicle propeller shaft, such, for example, as from the propeller shaft of an automotive vehicle. Another feature is the use of belt drive for this purpose, and another feature relates to the means by which driving tension of the belt is controlled by the operator. Referring to Figures 4 and 7: The cutter driving means comprises a pulley 30, preferably driven from the coupling of drive shaft 8, a belt 31 and smaller pulley 32. The pulley 32 is keyed to a shaft 52 journaled in bearings of arms 33 attached to frame-supporting element 12 (see Figure 3). Attached to channel iron 10 is a bracket 35 pivoted to which, by pivot pin 36, is an arm-like frame 37 having an idler pulley 38 engageable with the belt 31, as shown in Figure 7. The arm is moved toward or away from the position shown in Figure 7 by means of a finger 40, see Figure 8, attached to shaft 41, journaled in iron 10, and cooperating with a bar 42 suitably attached to the frame 37 for moving the frame 37 upwardly or away from the belt. The finger also engages the arm to press it downwardly to belt-tightening position. The shaft 41 is rotated by means of a lever 43, see Figure 2, which has a T-head, one end of which head is fixed to the shaft 41. The lever, of course, is arranged so that it can be operated from the driver's seat 6. The opposite end of the T-head 45 has an out-turned portion forming a bracket through an opening in which is passed an eye-bolt 46 threaded as shown and having adjustable stop nuts 47. The eye-bolt is connected with one end of a spring 48 secured to an arm 59 of the bracket 12.

When the lever is in the position shown in Figure 2, the arm 37 is in the position shown in Figure 4, leaving the belt in the slack non-driving condition. It will be noted that the axis of the spring lies at one side of the shaft 41 and in this manner, the lever and its associated parts are positively held in the position shown. When the lever is moved in the direction of the arrow from the position shown in Figure 2 so that the axis of the spring is brought to the opposite side of the shaft 41, the lever is positively held in that position by the spring, and the roller 38 is held in the belt-tightening position, shown in Figure 7, at which position the arm 40 occupies the position shown in Figure 8, pressing downwardly on arm 37.

The pulley 32 is fixed to shaft 52 and to this shaft is also fixed a crank disk 53, see Figures 1 and 3. The shaft 52 is axially aligned with pivots 14. The crank disk has the usual crank pin 54 and crank arm 55 connected by the usual ball and socket joint 56 to the cutter blade bar 28.

Figure 6:
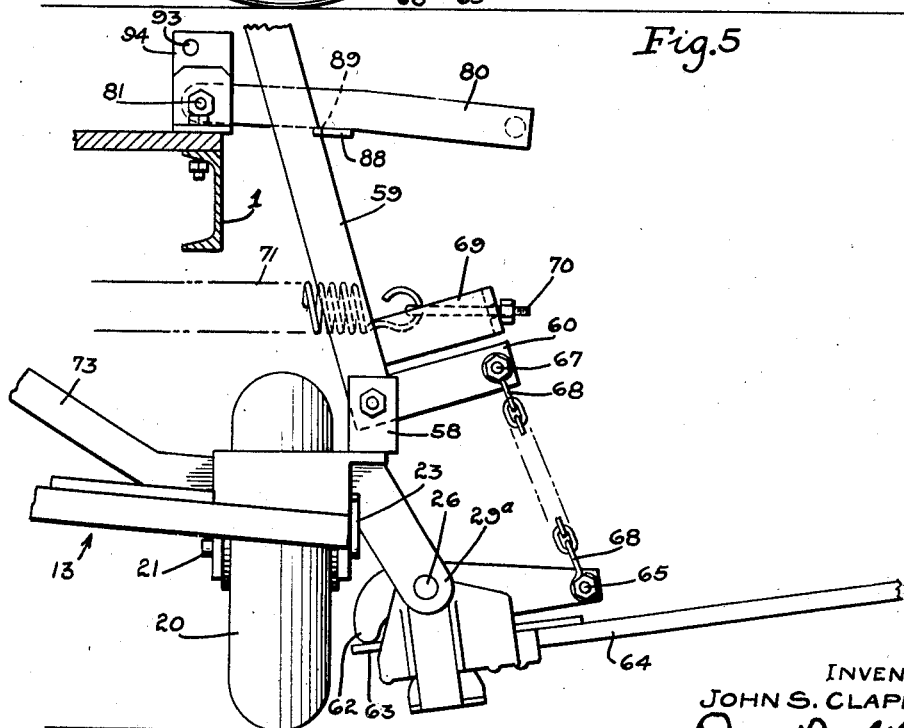
Figure 6 is a fragmentary view similar to Figure 4, but showing the ground wheel in ground-engaging position, and the mower raised and also illustrating the lock for holding the mower in non-mowing position.

Means is provided for raising and lowering the frame 13. The raised position of the frame is shown in full lines in Figure 4, the lowered position in dotted lines. The full line lowered position of the frame is shown in Figure 6. Means is also provided for adjustably lowering and raising the mower implement independently of the frame, and to this end there is provided on the outer end of the top of the frame 13, bracket 58. Pivoted to this bracket is an L-shaped lever providing a handle portion 59 and an L-extension 60. Pivotally mounted on one of the pivots 26, see Figures 4 and 6, is a lever having one arm 62 engaging a plate 63 of the frame 64 for the cutter, and having connected to the other arm as at 65 a chain 66 connected at its upper end as at 67 to the L-arm 60, see Figure 6. The chain connection includes clevises 68 connecting with the pivots 65 and 67. There is means associated with the cutter or mower raising means for yieldably counter-balancing the cutter frame 64 and its related parts and to this end there is provided on the operating arm 59, a bracket 69, see Figure 3. To this bracket is adjustably attached an eye-bolt 70 and to the eye-bolt is attached a spring 71, in turn attached to a clevis 72, pivotally secured to an arm 73 of the frame. This connection is also shown in Figure 4. The lowered position of the cutter frame 64 and its related parts is shown in dotted lines in Figure 4 and the raised position is shown in full lines in Figure 6.

The means for raising the frame 13 includes a lever 80 pivoted as at 81 to a bracket 82 suitably bolted to the chassis. Pivotally attached to the lever 80 as at 83 is a chain 84 having at its opposite end a hook 85 engaging in an opening 86 of bracket 87, see Figure 4. In the lowered position of the frame, shown in Figure 5, the hook 85 is disconnected, and the lever 80 occupies the position shown in Figure 6, for a purpose now to be described.

Means is provided by which the frame and implement raising and lowering levers are cooperable to secure the implement in the raised position shown in Figure 6. To this end, the lever 80 is provided with an arm 88 having a notch 89 shown in dotted lines in the figure. With this notch the lever 59 is engaged, as shown, holding the frame 64 of the cutter off the ground, that is holding the mowing implement in inoperative position, as may be useful while backing or maneuvering the vehicle to enter the desired line of cut.

Referring to Figure 4: Either before or after the frame 13 is raised to the position shown, the cutter frame 64 is moved by hand to the position shown in full lines, and it is secured in this upright position by means of a bar 90 suitably secured as at 91 to the cutter frame, said bar having a hook 92 detachably engaged in opening 93 of an upwardly extending portion 94 of bracket 82.

Assuming the parts to be positioned as shown in Figure 4 and assuming it is desired to bring them to mowing position: The nut 91 is loosened and the bar 90 is disengaged from the cutter bar frame 64 and said frame is then lowered by hand to a position in which it is counterbalanced by the spring 71. The lever 80 is then moved from the position shown in Figure 4 to that shown in Figure 6, to lower the frame to cause wheel 20 to engage the ground. If it is desired to raise the cutter bar frame 64 to and hold it in in-operative position, the lever 59 is moved to the position shown in Figure 6, and is engaged with the notch 89 of the bracket 88 of lever 80. When it is not desired to raise frame 13, the chain 84 is unhooked from opening 86 of bracket 87 and lever 80 is moved to the position of Figures 5 and 6.

If it is desired to remove the entire attachment from the automotive vehicle, all that is necessary is to disconnect the drawbar 17, and unbolt the channel bar 10, to disconnect it from the chassis.

A feature is the manner of securing the pulley 30 to a part of the rear wheel drive means, represented by the shaft 8. This shaft has a universal joint (not shown) part of which is bolted to a flange 95, and the pulley, which is formed of two halves bolted together as at 96, is, in turn, bolted also to flange 95 by bolts 97. In this manner, the pulley can be removed without in any way disturbing the driving connection.

I claim as my invention:

1. In combination with a vehicle having a chassis, a frame beneath the chassis and extending laterally therebeyond at one side, means pivoting the frame to the chassis adjacent the opposite side for free vertical swinging movements, a ground wheel for the frame, and a mowing implement pivoted to the unpivoted end of said frame and extending laterally of the frame and chassis for free vertical movement.

2. In combination with a vehicle having a chassis, a frame arranged beneath the chassis and extending laterally therebeyond at one side, means pivoting the frame to the chassis for free vertical swinging movements, a mowing implement pivoted to and extending laterally of the frame and chassis, a ground wheel for the frame, means for operating the mower implement for mowing, and means for adjustably raising and lowering the frame and mowing implement.

3. In combination with a vehicle having a chassis, a frame arranged transversely of and beneath the chassis and extending laterally therebeyond, means pivoting the frame to the chassis for free vertical swinging movements, a mowing implement pivoted to and extending laterally of the frame and chassis, a ground wheel for the frame, means on the vehicle for operating the mower implement for mowing, and means for adjustably raising and lowering the frame and mowing implement.

4. In combination with a vehicle having a chassis, a frame arranged transversely of and beneath the chassis and extending laterally therebeyond at one side, means pivoting the frame to the chassis for free vertical swinging movements, a mowing implement pivoted to and extending laterally of the frame and chassis, a ground wheel for the frame, means on the vehicle for operating the mower implement for mowing, and mechanism for adjustably raising and lowering the frame and mowing implement, including means for obtaining swinging adjustment of the mowing implement toward and away from mowing position whatever the adjusted position of the frame.

5. In combination with a vehicle having a chassis, a frame arranged transversely of and beneath the chassis and extending laterally therebeyond at one side, means pivoting the frame to the chassis, a mowing implement pivoted to and extending laterally of the frame and chassis, a ground wheel for the frame, means on the vehicle for operating the mower implement for mowing, means for adjustably raising and lowering the frame, means for independently adjustably raising and lowering the mowing implement, and means by which the frame and implement raising and lowering means are cooperable to secure the latter in raised position.

6. In combination with a vehicle having a chassis and a wheel-driving shaft, a frame arranged beneath the chassis and extending laterally therebeyond at one side, means pivoting the frame to the chassis for free vertical swinging adjustment, a mowing implement pivoted to and extending laterally of the frame and chassis, a ground wheel for the frame, belt drive means driven from the wheel-driving shaft for operating the mower implement for mowing, and mechanism for adjustably raising and lowering the frame and mowing implement.

7. In combination with a vehicle having a chassis, a frame arranged at a level below and in part beneath the chassis, means pivoting one side of the frame to one side of the chassis, said frame extending from said pivoting means toward and laterally beyond the opposite side of the chassis, a mowing implement and means pivoting it to the laterally extending part of the frame, the pivotal axes of frame and mowing implement both extending longitudinally of the vehicle, a ground wheel for said frame, means for operating said mowing implement for mowing, and means for adjustably raising and lowering said frame, and mowing implement.

8. In combination with a vehicle having a chassis, a frame arranged at a level below and in part beneath the chassis and means pivoting one side of the frame to one side of the chassis, said frame extending from the pivoting means toward and laterally beyond the opposite side of the chassis, a mowing implement and means pivoting it to the laterally extending part of the frame, a pivotal axes of frame and mowing implement both extending longitudinally of the vehicle, a ground wheel for said frame arranged at a point between the said pivotal axes, means on the vehicle for operating said mower implement, for mowing, and means for adjustably raising and lowering said frame and mowing implement.

9. In combination with a vehicle having a chassis, a front axle, front and rear wheels, a frame beneath the chassis and extending laterally therebeyond, means pivoting the frame to the chassis for free vertical swinging movements, a mowing implement pivoted to the chassis for free vertical movement, and extending laterally of the chassis, a ground wheel for the frame, a draft bar pivotally connecting the free end of the frame with the front axle, means for operating the mower implement for mowing, and means for adjustably raising and lowering the frame and mowing implement.

10. In combination with a vehicle having a chassis, a support detachably secured to said chassis, a frame beneath the chassis and extending laterally therebeyond at one side, means pivoting the frame to the support for free vertical swinging movements, a mowing implement pivoted to the chassis for free vertical movement and extending laterally of the chassis, a ground wheel for the frame, and a draft bar detachably connecting the free end of the frame to the vehicle for vertical movement.

11. In combination with an automotive vehicle having a chassis, wheels on front and rear axles and a rear axle propeller shaft, a frame beneath the chassis pivotally connected near one side and extending laterally between the axles beyond the other side of the chassis, a mowing implement pivoted to said laterally extended frame and extending therebeyond, both of said pivots being adapted to permit vertical swinging movements of the frame and mowing implements, ground-supporting means for said frame and implement, lifting means cooperative between the implement frame and chassis adapted to carry the implement in partially raised position or to carry the implement, frame and ground support in relatively higher position, and mower driving means comprising a member connected with said propeller shaft, an engageable and disengageable driving connection therefrom, a driven member located in substantial alignment with said pivotal connection of the frame to the chassis and operated by said driving connection, and an operating connection from said driven member to the mowing element of said implement.

12. In combination with a motor vehicle having a chassis, a rigid frame beneath the chassis and extending laterally therebeyond at one side, means pivoting the frame to the chassis adjacent the opposite side for free vertical swinging movements, a single rubber tired ground wheel for supporting the free end of the frame, and a mowing implement pivoted to the unpivoted outer portion of and extending laterally of the frame and chassis.

13. In combination with a motor vehicle having a chassis, a frame beneath the chassis and extending laterally therebeyond at one side, means pivoting the frame to the chassis adjacent the opposite side for free vertical swinging movements, a single rubber tired ground wheel for supporting the free end of the frame, and a mowing implement pivoted to the unpivoted outer portion of said frame outwardly beyond the ground wheel and extending laterally of the frame and chassis.

14. In combination with a rubber tired vehicle having a chassis, a frame beneath the chassis and extending laterally therebeyond at one side, means pivoting the frame to the chassis adjacent the opposite side for free vertical swinging movements, a single rubber tired ground-wheel for the frame arranged near its outer free end, and a mowing implement pivoted to the unpivoted outer end of said frame outwardly beyond but adjacent the ground-wheel and extending laterally of the frame and chassis.

15. In combination with a motor vehicle having a chassis and a propeller shaft, a frame beneath the chassis and extending laterally therebeyond at one side, means pivoting the frame to the chassis adjacent the opposite side for free vertical swinging movements, a ground wheel for the frame arranged near its outer end, a mowing implement pivoted to the unpivoted outer portion of said frame and extending laterally of the frame and chassis, and means by which the mower is driven, including a belt and pulley, one pulley being secured to the propeller shaft.

16. In combination with a motor vehicle having a chassis and a propeller shaft, a frame beneath the chassis and extending laterally therebeyond at one side, means pivoting the frame to the chassis adjacent the opposite side for free vertical swinging movements, a single rubber tired ground wheel for the frame arranged near its outer free end, a mowing implement pivoted to the unpivoted and outer portion of said frame and extending laterally of the frame and chassis for free vertical movement, and means by which the mower is driven, including a belt and pulleys, one pulley being secured to the propeller shaft.

17. In combination with a motor driven vehicle including front and rear rubber tired wheels, a chassis, and a propeller shaft, a mount-frame detachably secured to and beneath one of the side rails of the chassis, a rigid frame arranged beneath the chassis intermediately of the front and rear wheels and extending beyond the opposite side rail, pivots attaching one end of the rigid frame to the mount at a point well above the ground, a single rubber tired ground wheel supporting the rigid frame adjacent its unpivoted end, a crank having a shaft carried by the mounting frame, the shaft and pivots being axially aligned lengthwise of the vehicle and the shaft and crank lying intermediately of the pivots, a mowing implement pivoted to the free end of the rigid frame outwardly beyond the wheel for free vertical movement and extending laterally, means connecting the crank for operating the mower, and belt and pulley means for operating the crank shaft directly from the propeller shaft.

18. In combination with a motor driven vehicle including front and rear rubber tired wheels, a chassis, and a propeller shaft, a mount frame detachably secured to and beneath one of the side rails of the chassis, a rigid frame arranged beneath the chassis intermediately of the front and rear wheels, and extending beyond the opposite side rail, pivots attaching one end of the rigid frame to the mount at a point well above the ground, a single rubber tired ground wheel supporting the rigid frame adjacent its unpivoted end, a crank having a shaft carried by the mounting frame, the shaft and pivots being axially aligned lengthwise of the vehicle and the shaft and crank lying intermediately of the pivots, a mowing implement pivoted to the free end of the rigid frame outwardly beyond the wheel for free vertical movement and extending laterally, means connecting the crank for operating the mower, belt and pulley means for operating the crank shaft directly from the propeller shaft, and means in part on the vehicle for adjustably raising and lowering the frame and mowing implement including means permitting swinging adjustment of the mowing implement toward and away from mowing position whatever the adjusting position of the rigid frame.

JOHN S. CLAPPER.